United States Patent
Wang

(10) Patent No.: US 12,416,341 B2
(45) Date of Patent: Sep. 16, 2025

(54) BRAKE DISC ASSEMBLY AND FASTENING DEVICE THEREOF

(71) Applicant: CCYS HI-TECH INTERNATIONAL LTD., Taichung (TW)

(72) Inventor: Sheng-Yu Wang, Taichung (TW)

(73) Assignee: CCYS HI-TECH INTERNATIONAL LTD., Taichung (TW)

( * ) Notice: Subject to any disclaimer, the term of this patent is extended or adjusted under 35 U.S.C. 154(b) by 402 days.

(21) Appl. No.: 18/109,738

(22) Filed: Feb. 14, 2023

(65) Prior Publication Data
US 2024/0052898 A1 Feb. 15, 2024

(30) Foreign Application Priority Data

Aug. 9, 2022 (CN) .......................... 202222087496.3
Aug. 31, 2022 (CN) .......................... 202222296933.2

(51) Int. Cl.
*F16D 65/12* (2006.01)
*F16D 65/02* (2006.01)

(52) U.S. Cl.
CPC .... *F16D 65/123* (2013.01); *F16D 2065/1392* (2013.01)

(58) Field of Classification Search
CPC ............... F16D 65/123–127; F16D 2065/1392
USPC .................................................. 188/218 XL
See application file for complete search history.

(56) References Cited

U.S. PATENT DOCUMENTS

| | | | |
|---|---|---|---|
| 6,357,561 B2 * | 3/2002 | Ruiz ...................... | F16D 65/123 188/218 XL |
| 7,104,368 B2 * | 9/2006 | Cornolti ................ | F16D 65/123 188/218 XL |
| 11,428,283 B2 * | 8/2022 | Matti ..................... | F16D 65/123 |
| 2010/0051397 A1 * | 3/2010 | Kim ........................ | F16D 65/12 411/338 |

FOREIGN PATENT DOCUMENTS

| | | | | |
|---|---|---|---|---|
| CN | 111473074 A | * | 7/2020 | ......... F16D 65/0006 |
| CN | 111201387 B | | 11/2021 | |
| TW | M502761 U | | 6/2015 | |

* cited by examiner

*Primary Examiner* — Christopher P Schwartz
(74) *Attorney, Agent, or Firm* — Birch, Stewart, Kolasch & Birch, LLP

(57) ABSTRACT

A brake disc assembly includes a disc main body having first through holes, a connecting seat having second through holes, and fastening devices each including a bolt, a nut, a spacer clamped between the disc main body and connecting seat and including a third through hole, and a sleeve including a fourth through hole. An insertion portion of the sleeve is disposed in the first, second and third through holes. The bolt includes a rod portion inserted through the fourth through hole and having a threaded section onto which the nut is screwed so that the disc main body, spacer, connecting seat and an abutment portion of the sleeve are clamped between a head portion of the bolt and the nut. The brake disc assembly has concise structure and low manufacturing cost, and provides slight floating effect of the disc main body while preventing foreign objects from entering therein.

16 Claims, 14 Drawing Sheets

BRAKE DISC ASSEMBLY AND FASTENING DEVICE THEREOF

BACKGROUND OF THE INVENTION

1. Field of the Invention

The present invention relates generally to disc brake systems and more particularly, to a brake disc assembly, and a fastening device for fastening a disc main body and a connecting seat of the brake disc assembly to each other.

2. Description of the Related Art

Referring to Taiwan Patent No. M502761, the conventional brake disc assembly includes a circular-ring-shaped disc main body, a circular-plate-shaped connecting seat, and fastening members fastening the disc main body and the connecting seat to each other. The connecting seat is adapted to be fastened to a wheel, so the disc main body and the connecting seat will be rotated along with the wheel. When generating braking effect, a caliper of the disc brake system is driven to clamp the disc main body, so that the connecting seat and the wheel are both slowed down in rotary speed along with the disc main body, thereby stopping rotating.

In the abovementioned Taiwan Patent No. M502761, each of the fastening members is a bolt, which is directly screwed into threaded holes of the connecting seat and the disc main body, thereby fastening the disc main body and the connecting seat to each other. Although this fastening manner is simple in structure, the fastening member is liable to be slightly loosened by the rotation and vibration of the wheel, thereby deteriorating the fastening effect. The connection between the disc main body and the connecting seat is very important for ensuring the braking effect of the disc brake system being transmitted to the wheel positively, so many techniques about the connection between the disc main body and the connecting seat have been developed presently. For example, there are floating type disc assemblies which allow the disc main body to slide axially relative to the connecting seat, such as that described hereunder.

Referring to China Patent Publication No. 111201387 B, the patent publication discloses a connecting device for connecting a disc main body with a connecting seat, which includes a threaded rod, a nut and a spacer. The threaded rod includes a head portion and a threaded portion, which are located at two ends of the threaded rod, and three positioning portions arranged from the head portion to the threaded portion in the order of large to small width or outer radius. The three positioning portions of the threaded rod are located in through holes of the disc main body, the connecting seat and the spacer respectively. The nut is fixedly screwed onto the threaded portion and pressed on the connecting seat through the spacer, so that the threaded rod, the nut, the spacer and the connecting seat are fastened to each other, but the disc main body is slightly slidable axially in a small space between the head portion of the threaded rod and the connecting seat. Such floating type disc assembly has the advantage of preventing two sides of the disc main body from being applied with unequal force by the caliper, so as to prevent unequal wear between two sides of the disc main body and the caliper and prevent the disc main body from the deformation resulted from uneven force applied on two sides thereof.

However, in the aforementioned China Patent Publication No. 111201387 B, the connecting device is complicated in structure, resulting in high manufacturing cost, and doesn't adopt available threaded rods of common specification. The threaded rod thereof requires further tensile strength certification before use, and the threaded rods similar in structure but different in size require their respective certification, thereby further increasing inconvenience and cost in manufacture. Besides, there should be a certain space between the head portion of the threaded rod and the connecting seat for the disc main body to slide axially, so there may be gaps between the head portion of the threaded rod and the disc main body and between the connecting seat and the disc main body, into which external dust or foreign objects may enter to affect the operational performance of the brake disc assembly and increase the wear of the components thereof.

SUMMARY OF THE INVENTION

The present invention has been accomplished in view of the above-noted circumstances. It is an objective of the present invention to provide a brake disc assembly which is relatively more concise in structure, lower in cost, and enables the disc main body slight floating effect while preventing foreign objects from entering therein.

To attain the above objective, the present invention provides a brake disc assembly, which is defined with a first direction and a second direction opposite to the first direction. The brake disc assembly includes a disc main body, a connecting seat, and a plurality of fastening devices. The disc main body includes a front surface facing toward the first direction, a rear surface facing toward the second direction, and a plurality of first through holes penetrating through the front surface and the rear surface. The connecting seat includes a front surface facing toward the first direction, a rear surface facing toward the second direction, and a plurality of second through holes penetrating through the front surface and the rear surface of the connecting seat. Each of the fastening devices includes a bolt, a sleeve, a spacer and a nut. The spacer is clamped between the rear surface of the disc main body and the front surface of the connecting seat, and includes a third through hole. The sleeve includes an abutment portion and an insertion portion connected with each other, and a fourth through hole penetrating through the abutment portion and the insertion portion. The insertion portion of the sleeve is disposed in the first through hole, the second through hole and the third through hole. The bolt includes a head portion and a rod portion connected with each other. The rod portion is inserted through the fourth through hole, and includes a threaded section. The nut is fixedly screwed onto the threaded section, so that the disc main body, the spacer, the connecting seat and the abutment portion of the sleeve are clamped between the head portion of the bolt and the nut.

As a result, each component of the fastening device of the brake disc assembly of the present invention is directly or indirectly abutted against the disc main body and the connecting seat, so foreign objects can be prevented from entering between the fastening device and the disc main body or connecting seat to affect the operational performance thereof or increase the wear thereof. Meanwhile, the spacer can generate a little elasticity resulted from the material and/or shape thereof, enabling the disc main body slight axial movement relative to the connecting seat, i.e. enabling the disc main body slight floating effect. Besides, compared with the conventional floating type disc assemblies, the brake disc assembly of the present invention is more concise in structure, and can adopt bolts and nuts of available common specification, requiring no further tensile strength certification. Therefore, the brake disc assembly of the present invention is relatively more convenient in manufacture and thus has relatively lower costs.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1A:
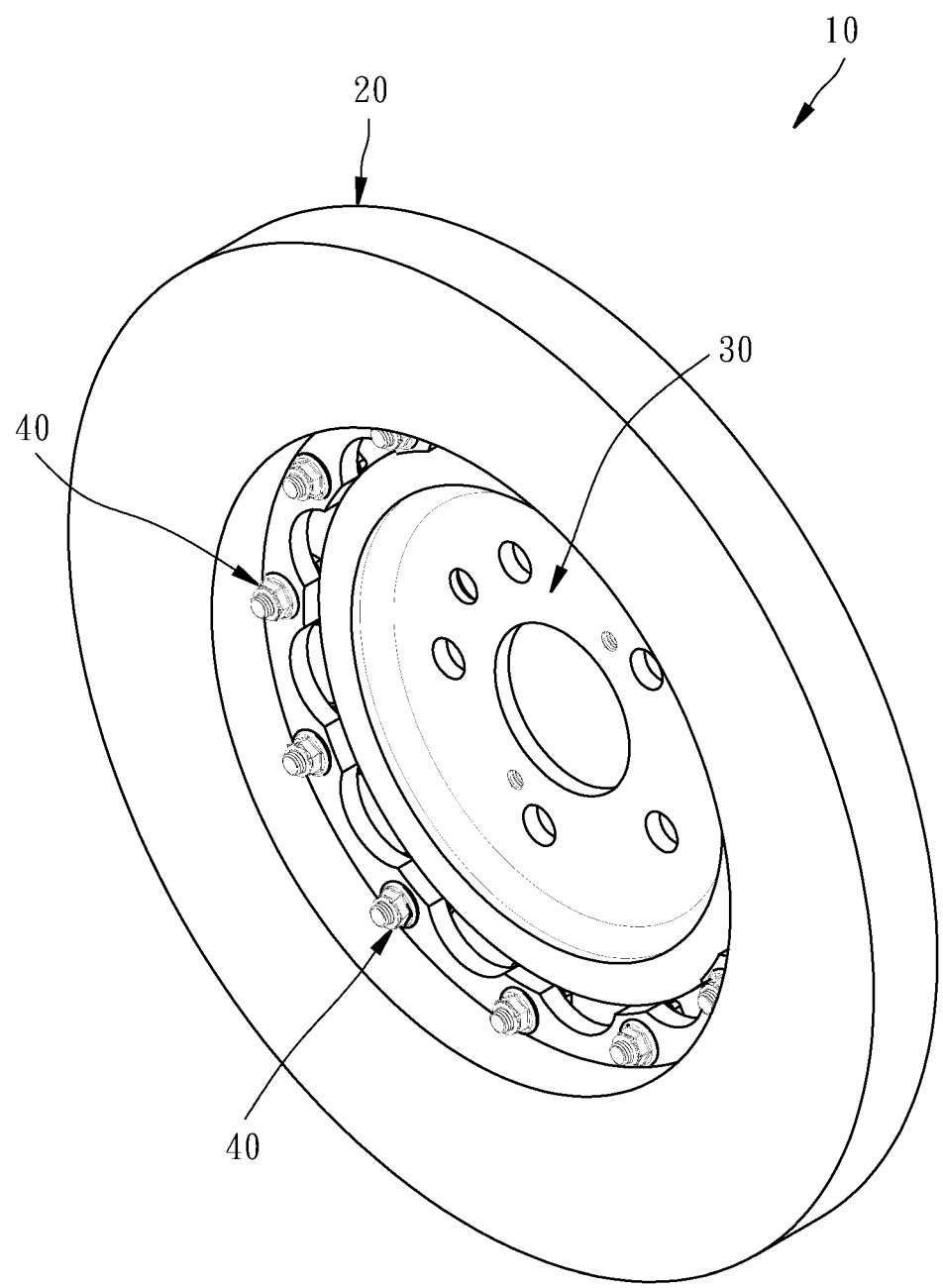
FIG. 1A and FIG. 1B are assembled perspective views of a brake disc assembly according to a first preferred embodiment of the present invention.

First of all, it is to be mentioned that same or similar reference numerals used in the following embodiments and the appendix drawings designate same or similar elements or the structural features thereof throughout the specification for the purpose of concise illustration of the present invention.

Referring to FIG. 1A to FIG. 3, a brake disc assembly 10 according to a first preferred embodiment of the present invention includes a disc main body 20, a connecting seat 30, and twelve fastening devices 40.

It should be firstly mentioned here that the brake disc assembly 10 is adapted to be fastened to a wheel (not shown) and rotated along with the wheel, thereby defined with a rotary axis, i.e. X-axis shown in the figures. In the present invention, the positive direction of X-axis is defined as a first direction, and the negative direction of X-axis is defined as a second direction. Besides, the word 'transverse' mentioned in the present invention refers to any direction perpendicular to the aforementioned rotary axis, i.e. perpendicular to the first direction and the second direction. In other words, the word 'transverse' mentioned in the present invention refers to locating on Y-Z plane. Therefore, the transverse size of each component mentioned in the present invention refers to the size such as width or diameter defined on Y-Z plane, and the transverse cross-section of each component mentioned in the present invention refers to the sectional shape on Y-Z plane.

Figure 5:
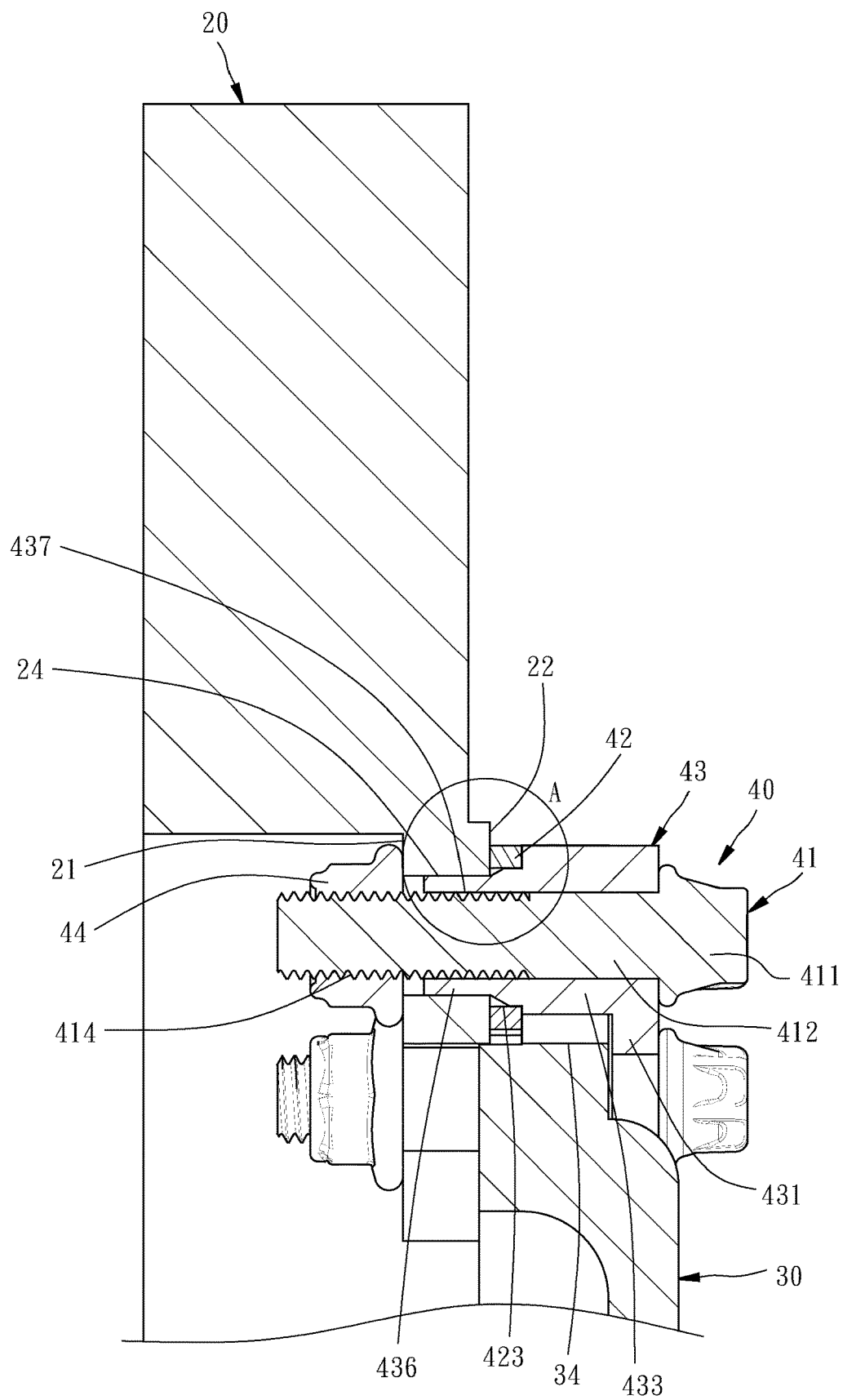
FIG. 5 is a sectional view taken along the line 5-5 in FIG. 3.

The present invention is unlimited in shapes of the disc main body 20 and the connecting seat 30, which can adopt various conventional configurations. The disc main body 20 includes a front surface 21 facing toward the first direction (the positive direction of X-axis), a rear surface 22 (as shown in FIG. 5) facing toward the second direction (the negative direction of X-axis), and twelve first through holes 24 penetrating through the front and rear surfaces 21 and 22. The connecting seat 30 includes a front surface 31 facing toward the first direction, a rear surface 32 facing toward the second direction, and twelve second through holes 34 penetrating through the front and rear surfaces 31 and 32. The fastening devices 40 are each disposed in a first through hole 24 and a second through hole 34 to combine the disc main body 20 and the connecting seat 30 with each other, which will be specified hereinunder.

Figure 4:
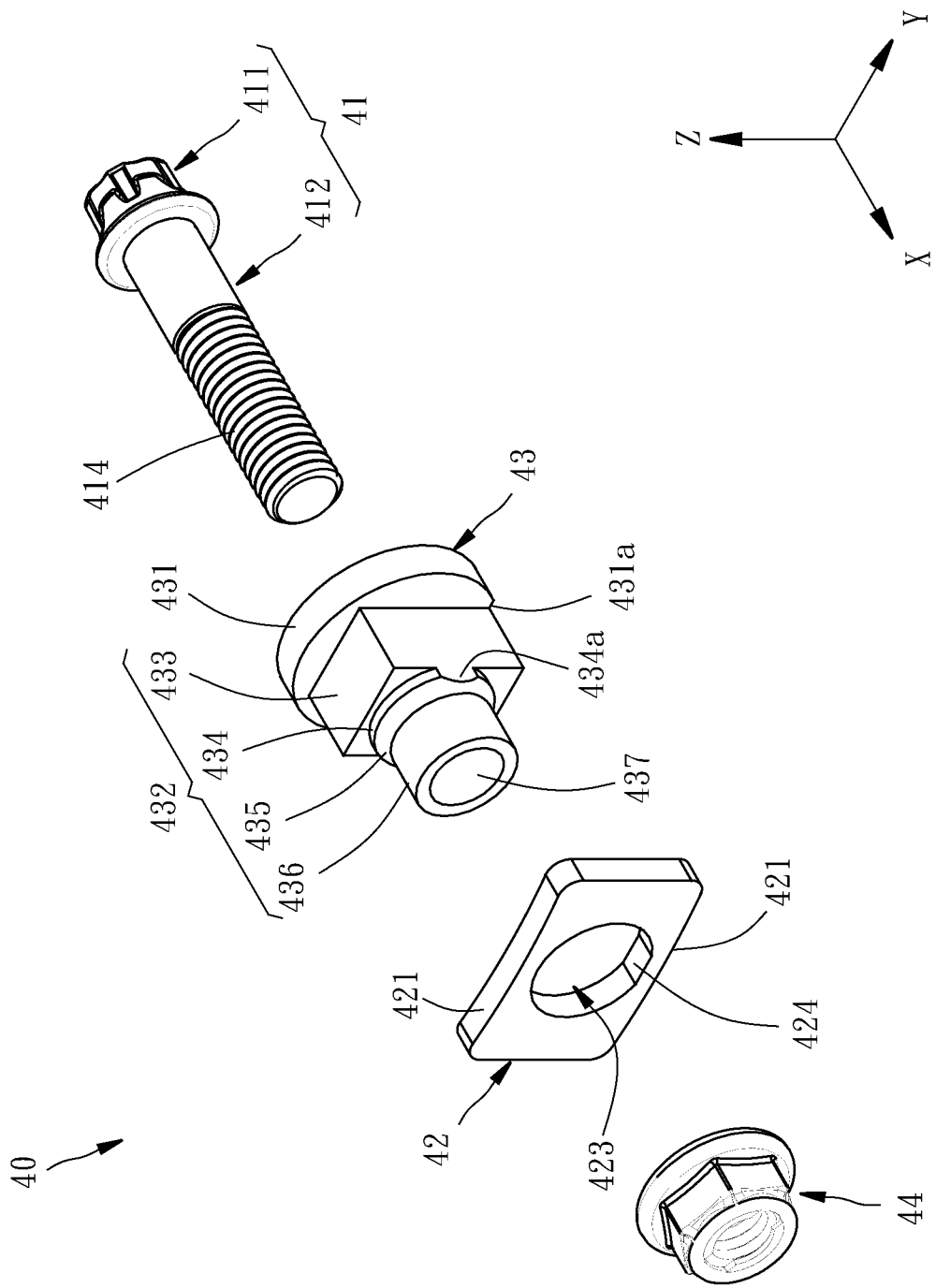
FIG. 4 is an exploded perspective view of a fastening device of the brake disc assembly according to the first preferred embodiment of the present invention.

Referring to FIG. 4, each fastening device 40 includes a bolt 41, a spacer 42, a sleeve 43, and a nut 44. The bolt 41 includes a head portion 411 and a rod portion 412 connected with each other. The rod portion 412 includes a threaded section 414 located at the terminal end of the rod portion 412. The spacer 42 is an approximately rectangular thin sheet with four rounded corners, but two long sides 421 thereof are slightly arc-shaped for matching in shape with the connecting seat 30, but the present invention is unlimited thereto. The spacer 42 includes a third through hole 423 located at the center of the spacer 42. The third through hole 423 is approximately circular in transverse cross-section, but the inner wall thereof is partially shaped as a plane 424, but not arc surface. In other words, the third through hole 423 is non-circular. The sleeve 43 includes an abutment portion 431 and an insertion portion 432 connected with each other. The insertion portion 432 includes a large insertion section 433, a medium insertion section 434, an inclined section 435 and a small insertion section 436, which are connected in order from the abutment portion 431, and provided from large to small in transverse size in the above-described order. Besides, the sleeve 43 further includes a fourth through hole 437 penetrating through the abutment portion 431, the large insertion section 433, the medium insertion section 434, the inclined section 435 and the small insertion section 436.

Referring to FIG. 2 and FIG. 4 to FIG. 6, the insertion portion 432 of the sleeve 43 is inserted from the rear surface 32 of the connecting seat 30 through the second through hole 34 of the connecting seat 30 and the third through hole 423 of the spacer 42 in order, and inserted into the first through hole 24 of the disc main body 20, so that the large insertion section 433 is located in the second through hole 34 of the connecting seat 30, the medium insertion section 434 and the inclined section 435 are located in the third through hole 423 of the spacer 42, the small insertion section 436 is located in the first through hole 24 of the disc main body 20, and the spacer 42 is clamped between the rear surface 22 of the disc main body 20 and the front surface 31 of the connecting seat 30. Then, the rod portion 412 of the bolt 41 is inserted through the fourth through hole 437 from the abutment portion 431 of the sleeve 43, and the threaded section 414 of the bolt 41 protrudes from the front surface 21 of the disc main body 20. At last, the nut 44 is fixedly screwed onto the threaded section 414 of the bolt 41, so that the head portion 411 of the bolt 41 is abutted against the abutment portion 431 of the sleeve 43, the nut 44 is abutted against the front surface 21 of the disc main body 20, and the disc main body 20, the spacer 42, the connecting seat 30 and the abutment portion 431 of the sleeve 43 are clamped between the head portion 411 of the bolt 41 and the nut 44. The shape and size relations between each part of the sleeve and each through hole will be specified hereunder.

Figure 2:
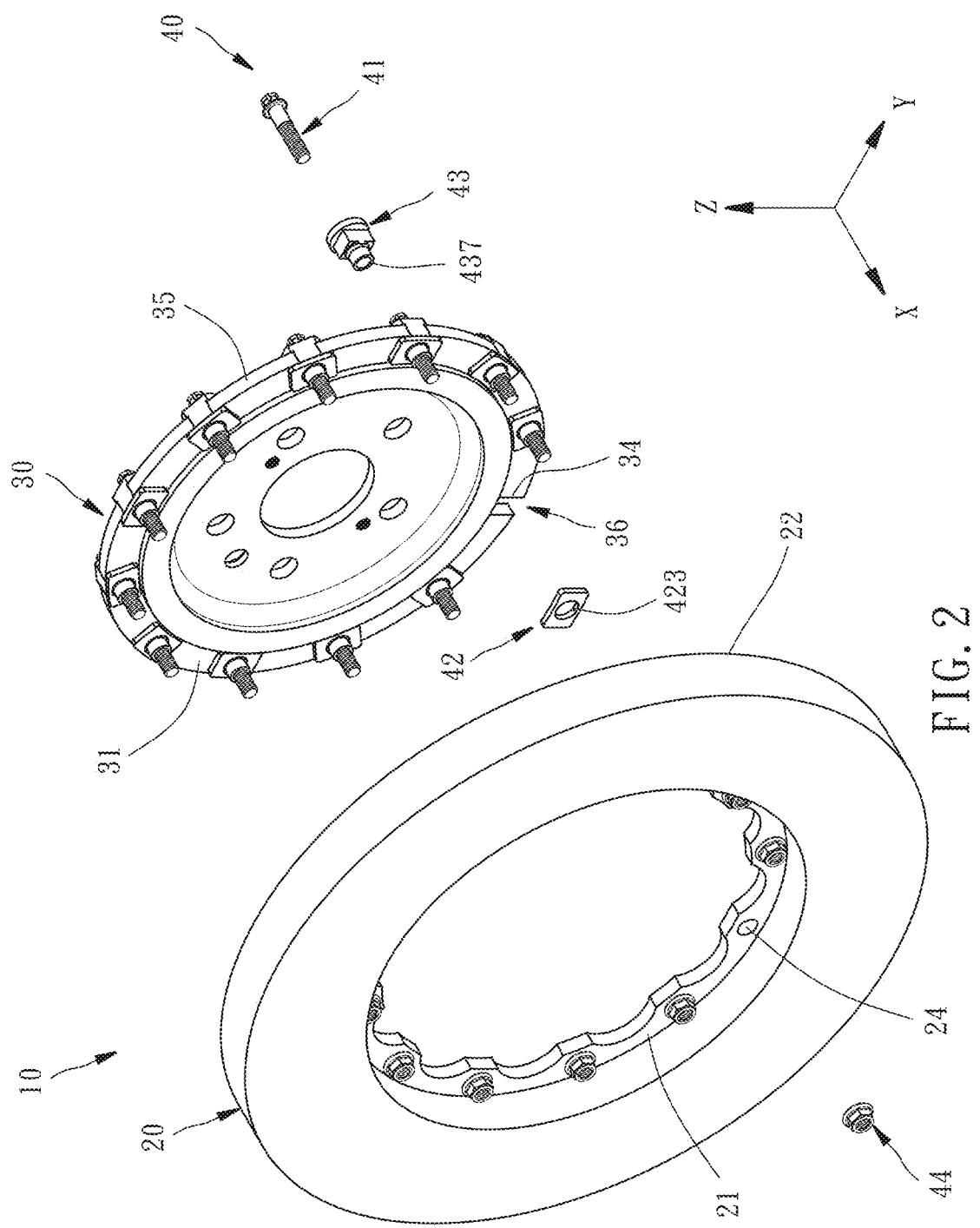
FIG. 2 is an exploded perspective view of the brake disc assembly according to the first preferred embodiment of the present invention.
Figure 3:
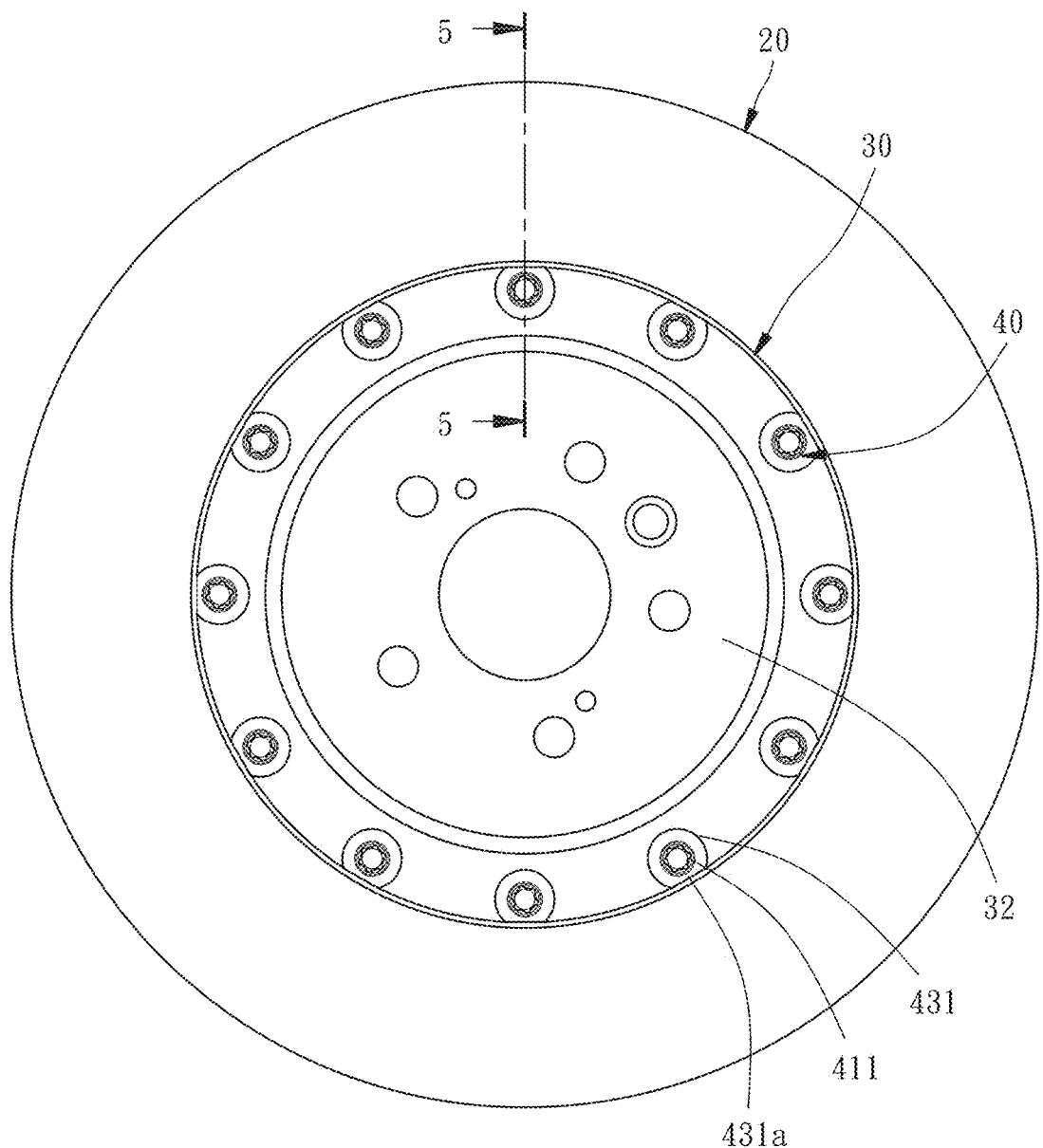
FIG. 3 is a rear view of the brake disc assembly according to the first preferred embodiment of the present invention.

Referring to FIG. 2 and FIG. 4, the abutment portion 431 of the sleeve 43 is approximately circular in transverse cross-section, but a side thereof is shaped as a plane 431a for matching in shape with the connecting seat 30. The abutment portion 431 is larger in both Y-axial and Z-axial sizes than the second through hole 34. When the assembly is accomplished, the abutment portion 431 is abutted against the rear surface 32 of the connecting seat 30. The large insertion section 433 of the sleeve 43 and the second through hole 34 of the connecting seat 30 are both non-circular in transverse cross-section. For example, they are both approximately rectangular in this embodiment. Such feature can limit the sleeve 43 from rotating relative to the connecting seat 30, thereby making the fastening effect of the fastening device 40 even better. Besides, a short side of the second through hole 34 of the connecting seat 30 is opened, thereby having an opening 36 on an outer peripheral surface 35 of the connecting seat 30, which is adapted for the large insertion section 433 of the sleeve 43 to enter the second through hole 34 through the opening 36, thereby convenient for assembly. The transverse size (the width along Y-axis in FIG. 4) of the short side of the large insertion section 433 of the sleeve 43 is about equal to the diameter of the third through hole 423 of the spacer 42, and the transverse size (the width along Z-axis in FIG. 4) of the long side of the large insertion section 433 is larger than the diameter of the third through hole 423. Therefore, the large insertion section 433 can't enter the third through hole 423. The medium insertion section 434 of the sleeve 43 is matched in transverse size with the third through hole 423, which means the sizes of them are about equal so that the medium insertion section 434 is just adapted to be inserted in the third through hole 423. More specifically speaking, the medium insertion section 434 is approximately circular in transverse cross-section, but three sides thereof are each shaped as a plane 434a, wherein only one of them facing toward the positive direction of Y-axis is shown in FIG. 4, and the other two of them facing toward the negative direction of Y-axis and the negative direction of Z-axis are not shown. The diameter of the medium insertion section 434 is only a little smaller than the diameter of the third through hole 423, and the planes 434a correspond in position and size to the plane 424 of the third through hole 423. When the assembly is accomplished, one of the planes 434a of the medium insertion section 434 is in face-to-face contact with the plane 424 of the third through hole 423. In other words, the medium insertion section 434 and the third through hole 423 are both non-circular in transverse cross-section. Such feature can limit the sleeve 43 and the spacer 42 from rotating relative to each other, thereby making the fastening effect of the fastening device 40 even better. The inclined section 435 of the sleeve 43 is circular in transverse cross-section, and the diameter thereof gradually decreases from the medium insertion section 434 to the small insertion section 436. The small insertion section 436 is shaped as a cylinder uniform in diameter, and the diameter thereof is smaller than the diameter of the medium insertion section 434 and about equal to the diameter of the first through hole 24 of the disc main body 20, so that the small insertion section 436 is just adapted to be inserted in the first through hole 24.

Figure 6:
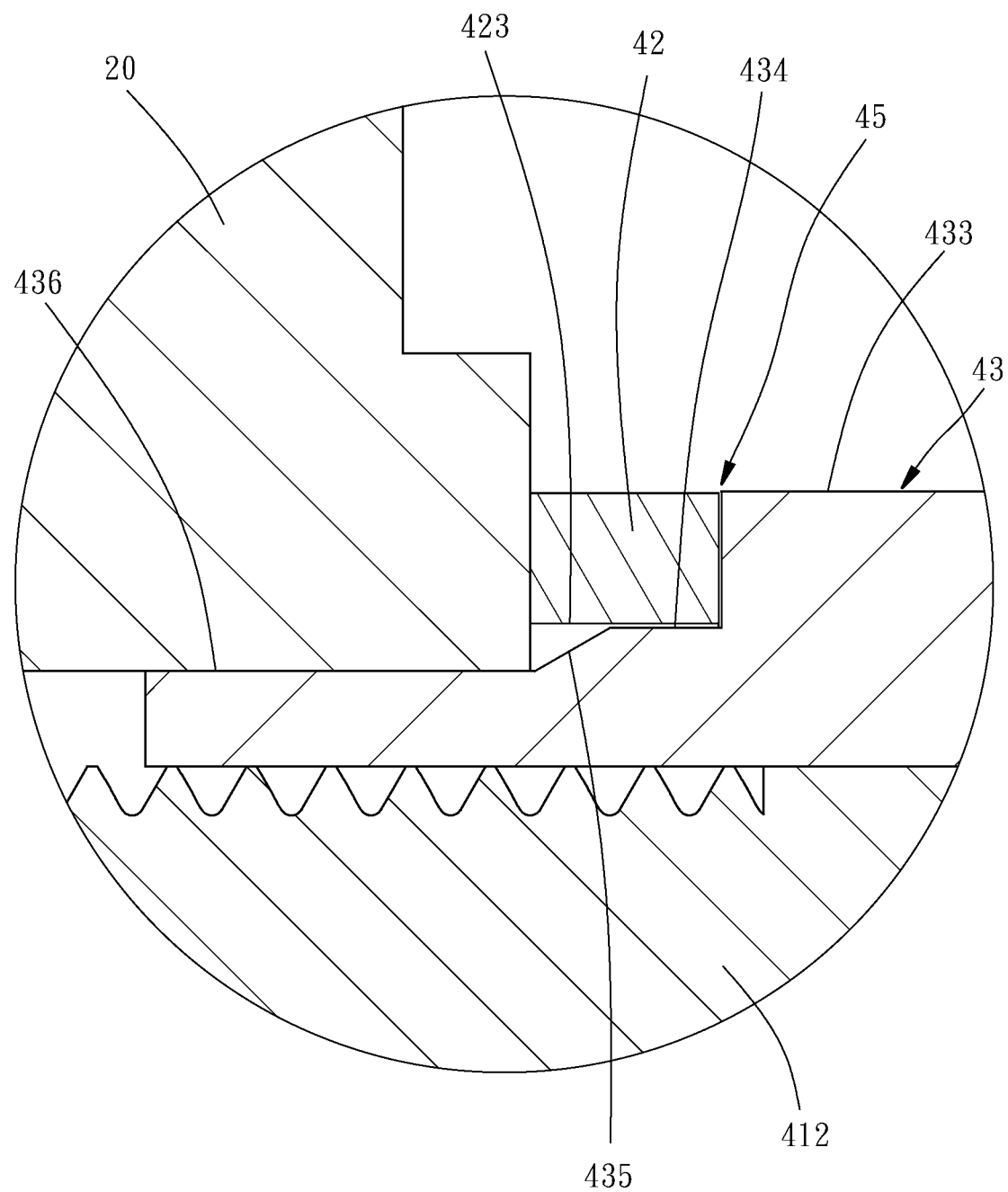
FIG. 6 is an enlarged view of the part A in FIG. 5.
Figure 7:
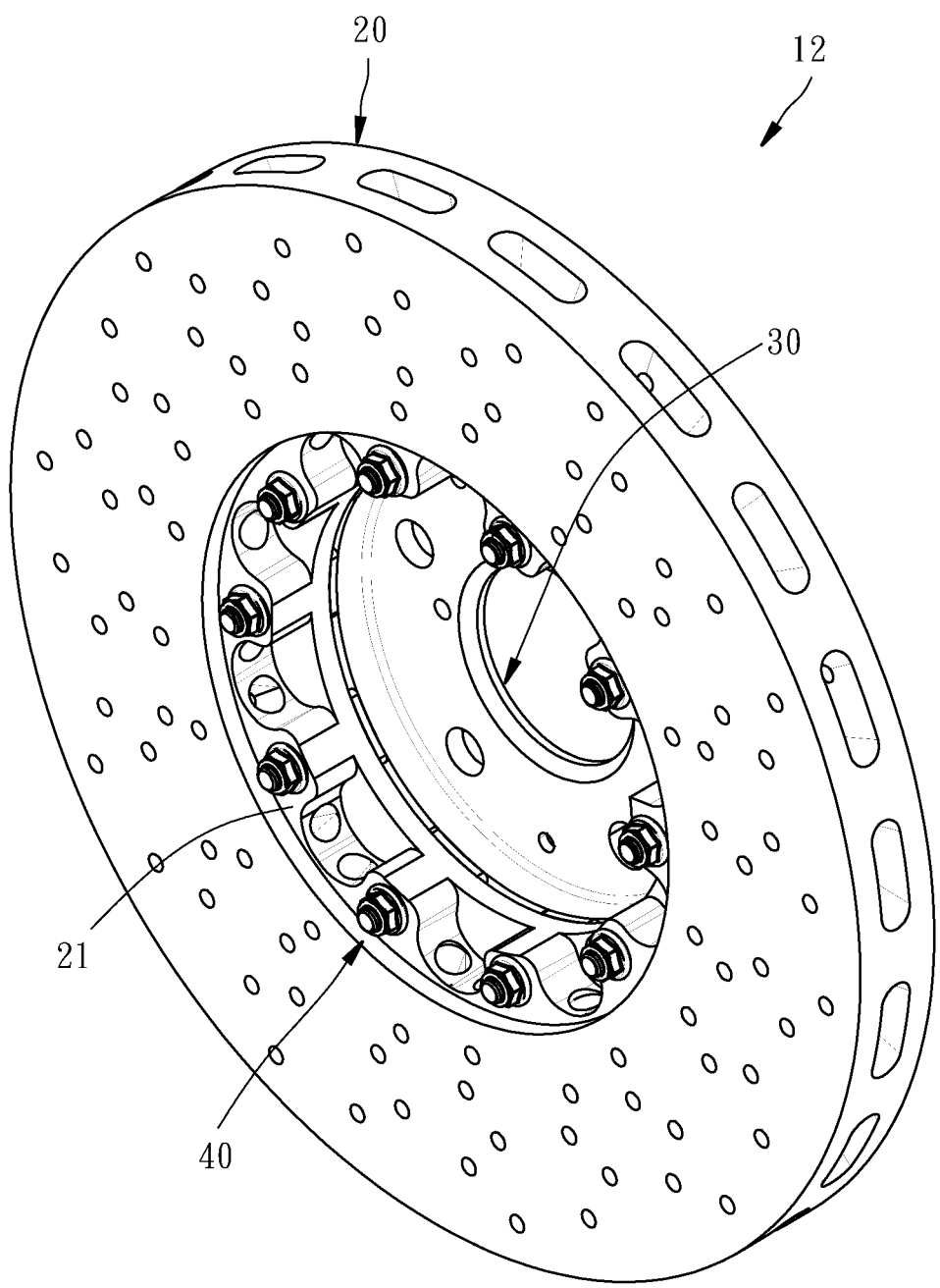
FIG. 7 and FIG. 8 are assembled perspective views of a brake disc assembly according to a second preferred embodiment of the present invention.

By the above-described fastening device 40, the spacer 42 is clamped between the disc main body 20 and the connecting seat 30, and the spacer 42 can be made of the material having relatively higher elasticity and can be even made into a warped shape or other elastically deformable shapes, so that in the condition that the front and rear surfaces 21 and 22 of the disc main body 20 are maintained abutted against the nut 44 and the spacer 42, the elasticity of the spacer 42 makes the disc main body 20 still slightly movable axially relative to the connecting seat 30, that means the disc main body 20 is enabled slight floating effect. Further speaking, as shown in FIG. 6, a gap 45 may be provided between the large insertion section 433 of the sleeve 43 and the spacer 42, that means a small part of the medium insertion section 434 of the sleeve 43 is located out of the third through hole 423 of the spacer 42. Besides, a small part of the small insertion section 436 of the sleeve 43 is located in the third through hole 423 of the spacer 42. Such configuration design enables the disc main body 20 to slightly slide relative to the connecting seat 30 by the elasticity of the spacer 42 when a force is applied to the disc main body 20. For example, when a relatively larger force is applied to the disc main body 20, the disc main body 20 can slide to the juncture of the inclined section 435 and the small insertion section 436, or even further slide a little onto the inclined section 435. In other words, the above-described configuration designs of the gap 45, the small insertion section 436 being partially located in the third through hole 423, and the inclined section 435, are all beneficial to the slight floating effect of the disc main body 20 when a force is applied to the disc main body 20. However, the present invention is unlimited thereto, but may bring the slight floating effect by only the elasticity of the spacer 42. In the condition without the aforementioned gap 45, there is no outward open gap between the components of the brake disc assembly of the present invention. Alternatively, in the condition that the connecting seat 30 is provided without the aforementioned opening 36 convenient for assembly, the connecting seat 30 may be provided with an additional part covering the spacer 42 so that the gap 45 is not outward open. As to the configuration design with the gap 45 such as that in this embodiment, the practical gap 45 is tiny and located at the middle of the fastening device 40 to become concealed, thereby not an obvious gap. In each of the above-described conditions, the fastening device 40 of the brake disc assembly of the present invention is effective in preventing external dust or foreign objects from entering between the components of the fastening device 40. Besides, the components of the fastening device 40 are all directly or indirectly abutted against the disc main body 20 and the connecting seat 30, so external dust or foreign objects are prevented from entering between the fastening device 40 and the disc main body 20 or connecting seat 30 to affect the operational performance thereof or increase the wear thereof. In addition, compared with the conventional floating type disc assemblies, the brake disc assembly 10 of the present invention is more concise in structure, and can adopt the bolts 41 and nuts 44 of available common specification, requiring no further tensile strength certification. Therefore, the brake disc assembly 10 of the present invention is relatively more convenient in manufacture and has relatively lower costs.

It is to be mentioned that in the above-described embodiment, the sleeve 43 is firstly inserted through the second through hole 34 of the connecting seat 30 and the third through hole 423 of the spacer 42, and then inserted into the first through hole 24 of the disc main body 20, so the second through hole 34, the third through hole 423 and the first through hole 24 are matched in shape with the larger, medium and small insertion sections 433, 434 and 436 and provided from large to small in transverse size. However, the sleeve 43 may be disposed in opposite direction so that the abutment portion 431 of the sleeve 43 is abutted against the front surface 21 of the disc main body 20, as long as the associated through holes are also modified correspondingly. Besides, the bolt 41 may be disposed in opposite direction, which means the head portion 411 of the bolt 41 and the nut 44 may be positionally exchanged with each other. However, the arrangements of the sleeve 43 and the bolt 41 in the directions as shown in the above-described embodiment are relatively more beneficial to the manufacture and assembly, and can bring relatively better fastening effect.

Referring to FIG. 7 to FIG. 12, a brake disc assembly 12 according to a second preferred embodiment of the present invention is similar to the above-described brake disc assembly 10 in the first preferred embodiment, also including a disc main body 20, a connecting seat 30, and a plurality of fastening devices 40, but they have the difference described hereunder.

As described above, the present invention is unlimited in shapes of the disc main body 20 and the connecting seat 30. The brake disc assembly 10 in the first preferred embodiment adopts the disc main body 20 with solid configuration, but the brake disc assembly 12 in this embodiment adopts the disc main body 20 with ventilated configuration. This part is relatively less related to the technical features of the present invention, thereby not described in detail hereinunder. Besides, the brake disc assembly 10 in the first preferred embodiment adopts twelve fastening devices 40, but the brake disc assembly 12 in this embodiment adopts ten fastening devices 40. In fact, the amount of the fastening devices 40 of the present invention is unlimited, which can be modified according to structural demands. Except for the above-described difference, the primary difference between this embodiment and the first preferred embodiment lies in the sleeve 43 of the fastening device 40, and the configuration design of the connecting seat 30 corresponding to the sleeve 43. The sleeve 43 and the connecting seat 30 in this embodiment will be specified hereunder.

Figure 9:
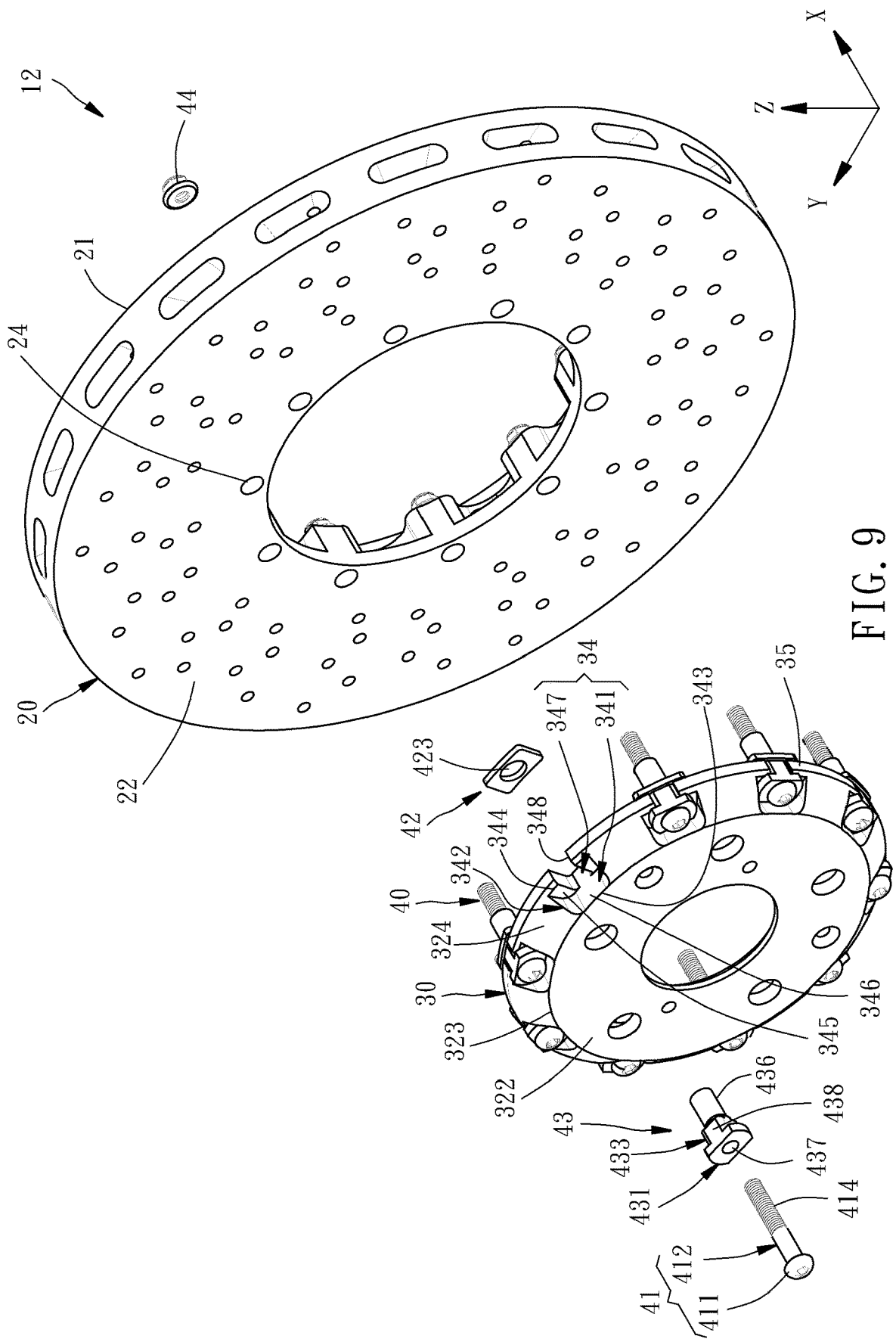
FIG. 9 is an exploded perspective view of the brake disc assembly according to the second preferred embodiment of the present invention.
Figure 10:
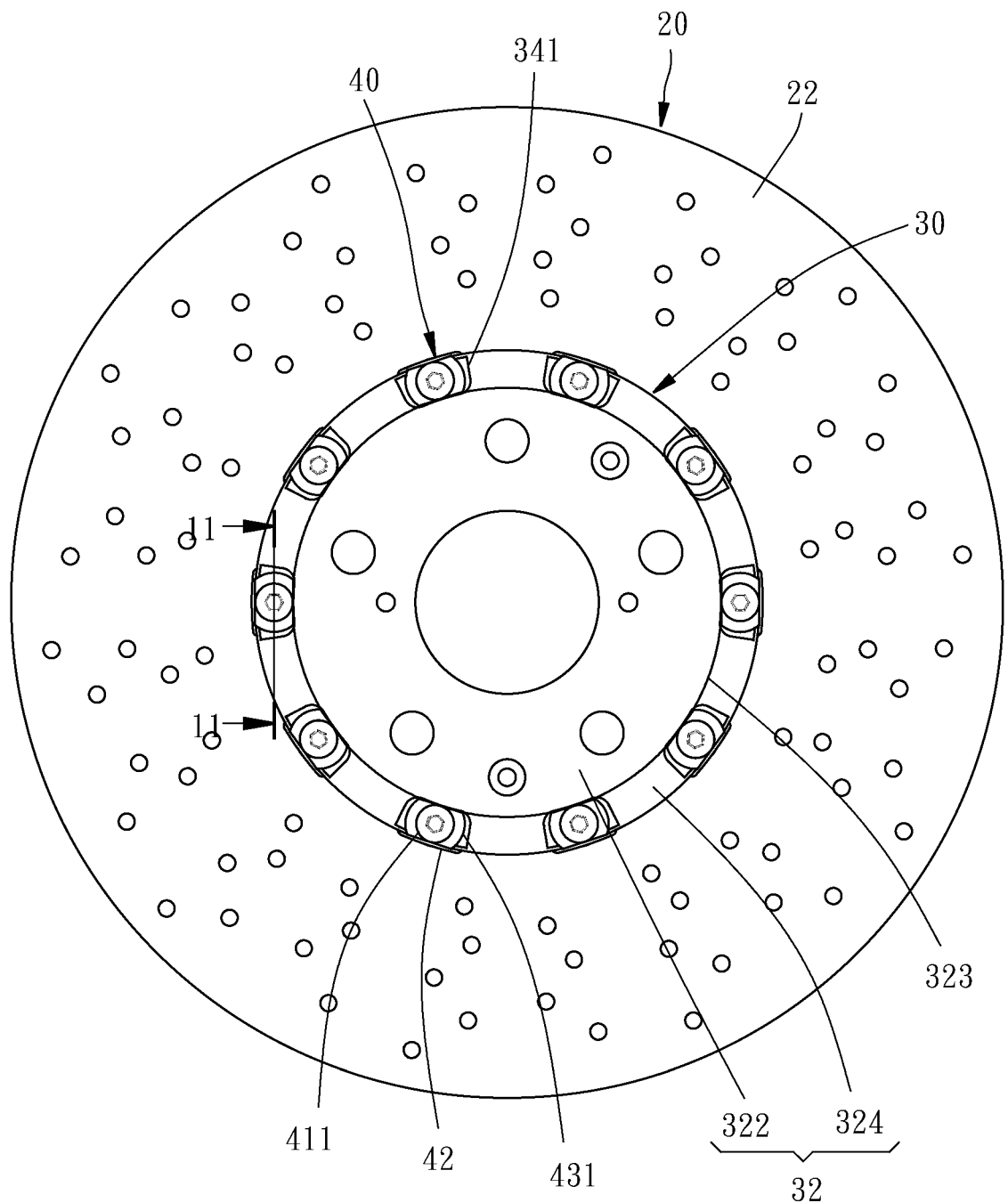
FIG. 10 is a rear view of the brake disc assembly according to the second preferred embodiment of the present invention.
Figure 10:
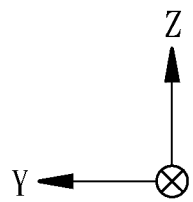

As shown in FIG. 9, the abutment portion 431 of the sleeve 43 is approximately rectangular in transverse cross-section about the same in orientation and size to the spacer 42, but two short sides of the abutment portion 431 are arc-shaped. The large insertion section 433 of the sleeve 43 is approximately rectangular in transverse cross-section but provided with four rounded corners, and two short sides thereof are flush with two long sides of the abutment portion 431 respectively so that they collectively form two side surfaces 438 of the sleeve 43. In other words, the aforementioned two side surfaces 438 are located on two opposite sides of the sleeve 43, and each side surface 438 is simultaneously located at the abutment portion 431 and the large insertion section 433. The other parts of the sleeve 43 in this embodiment are similar to those of the sleeve 43 in the first preferred embodiment, thereby not repeatedly described hereinunder.

Figure 8:
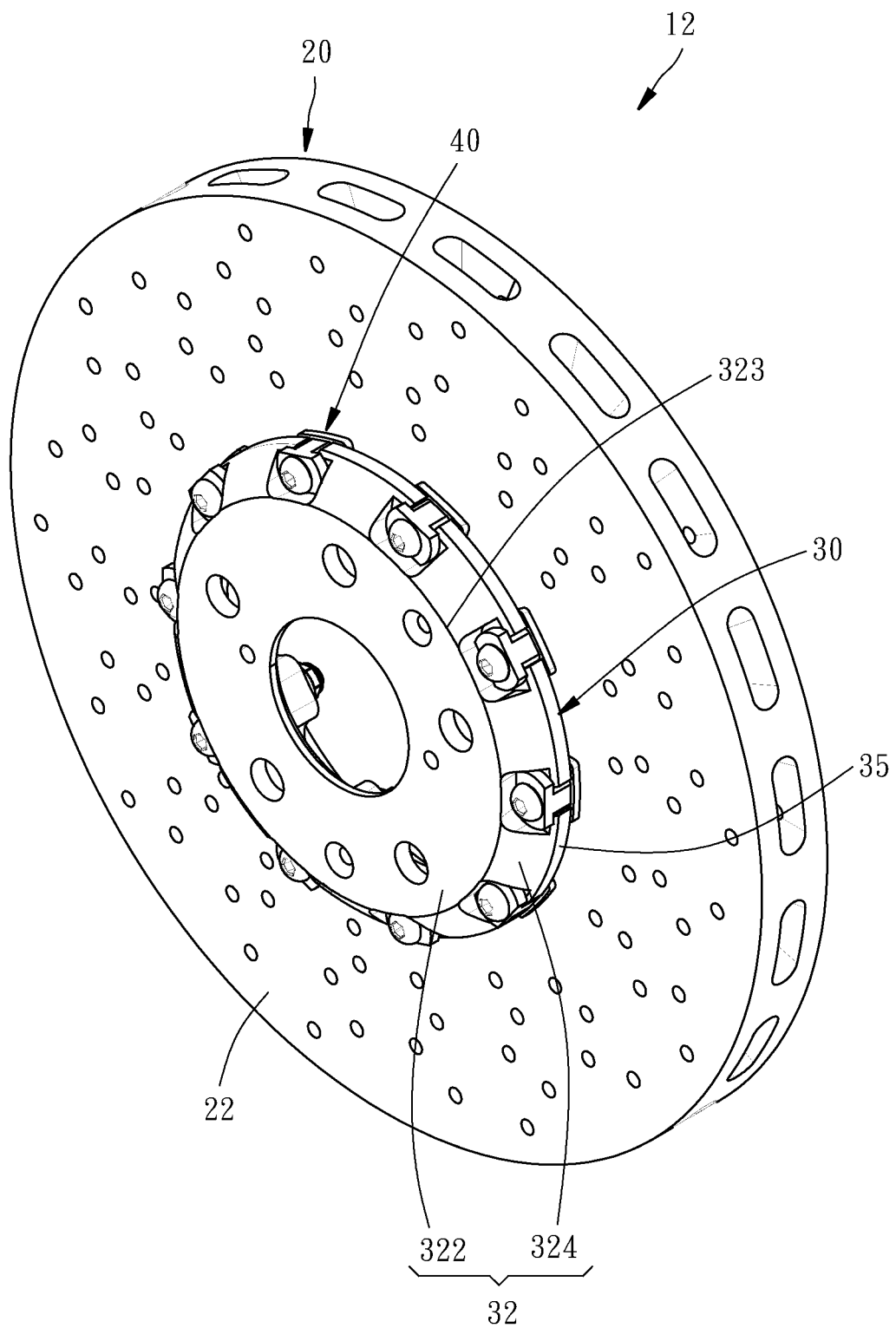

As shown in FIG. 8, the rear surface 32 of the connecting seat 30 includes a central region 322 shaped as a circular ring plane, and a peripheral region 324 located on the periphery of the central region 322 and slightly arc-shaped. The peripheral region 324 inclinedly extends outward and frontward from an outer periphery 323 of the central region 322 to the outer peripheral surface 35 of the connecting seat 30. The aforementioned word 'outward' means leaving the outer periphery 323, and the aforementioned word 'frontward' means approaching the front surface 31, i.e. toward the positive direction of X-axis shown in FIG. 8. As shown in FIG. 8 and FIG. 9, each second through hole 34 includes a recess 341 recessed from the peripheral region 324 of the rear surface 32 of the connecting seat 30. The recess 341 has a recess opening 342 located in the peripheral region 324. The recess opening 342 has an inner edge 343 located at the outer periphery 323 of the central region 322, and an outer edge 344 opposite to the inner edge 343 and adjacent to the outer peripheral surface 35 of the connecting seat 30. The recess 341 further has an inner bottom surface 345 connected to the outer edge 344 of the recess opening 342, and a recess inner wall 346 extending from the inner edge 343 of the recess opening 342 to the inner bottom surface 345. Each second through hole 34 further includes an insertion hole 347 extending from the inner bottom surface 345 of the recess 341 to the front surface 31 of the connecting seat 30. The recess inner wall 346 of the recess 341 is directly connected with the insertion hole 347, which means the recess inner wall 346 and a part of the inner wall of the insertion hole 347 are directly connected to become a same surface.

Figure 11:
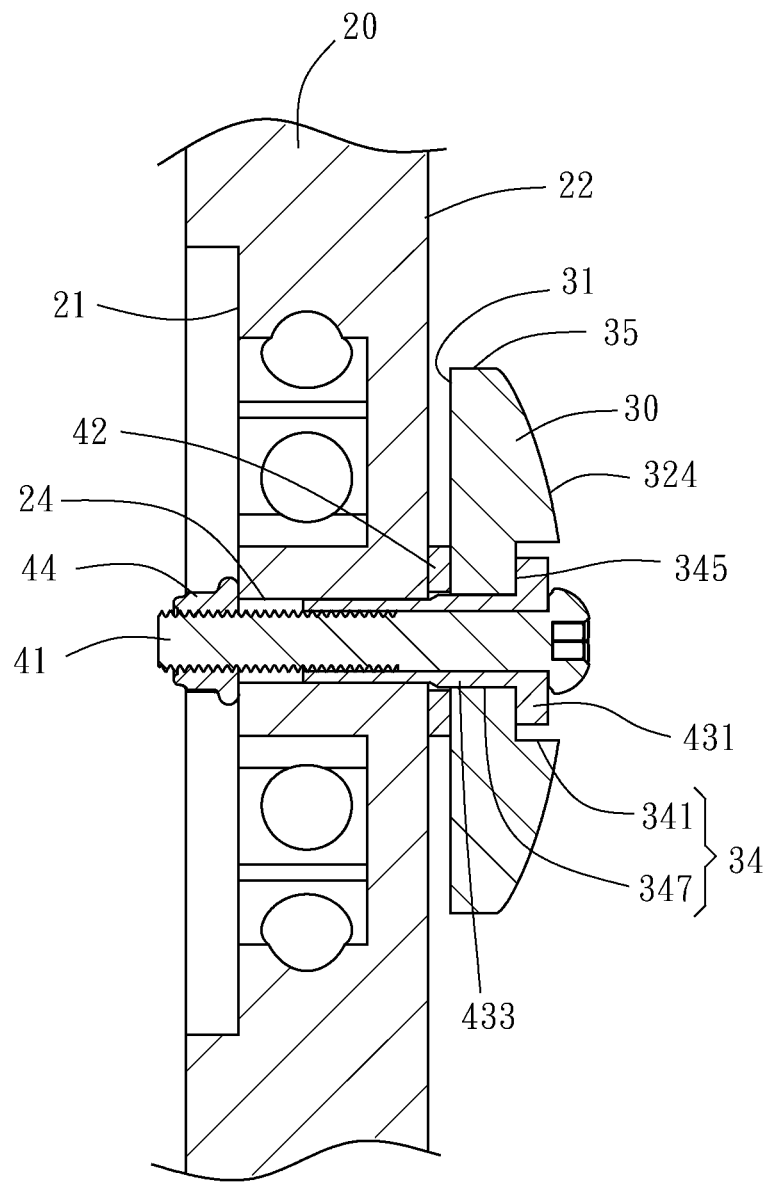
FIG. 11 is a sectional view taken along the line 11-11 in FIG. 10.
Figure 12:
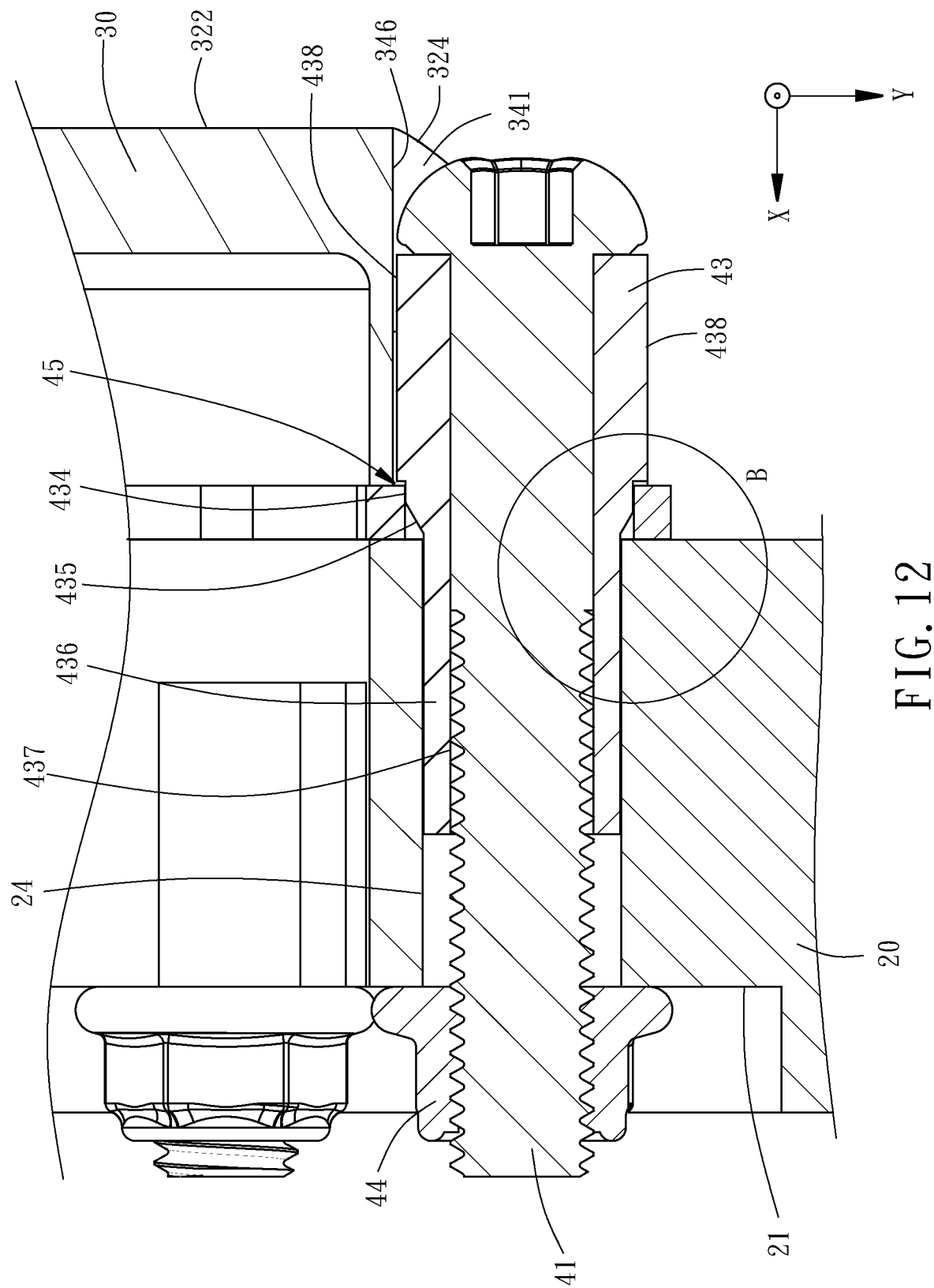
FIG. 12 is another sectional view of the part shown in FIG. 11.
Figure 13:
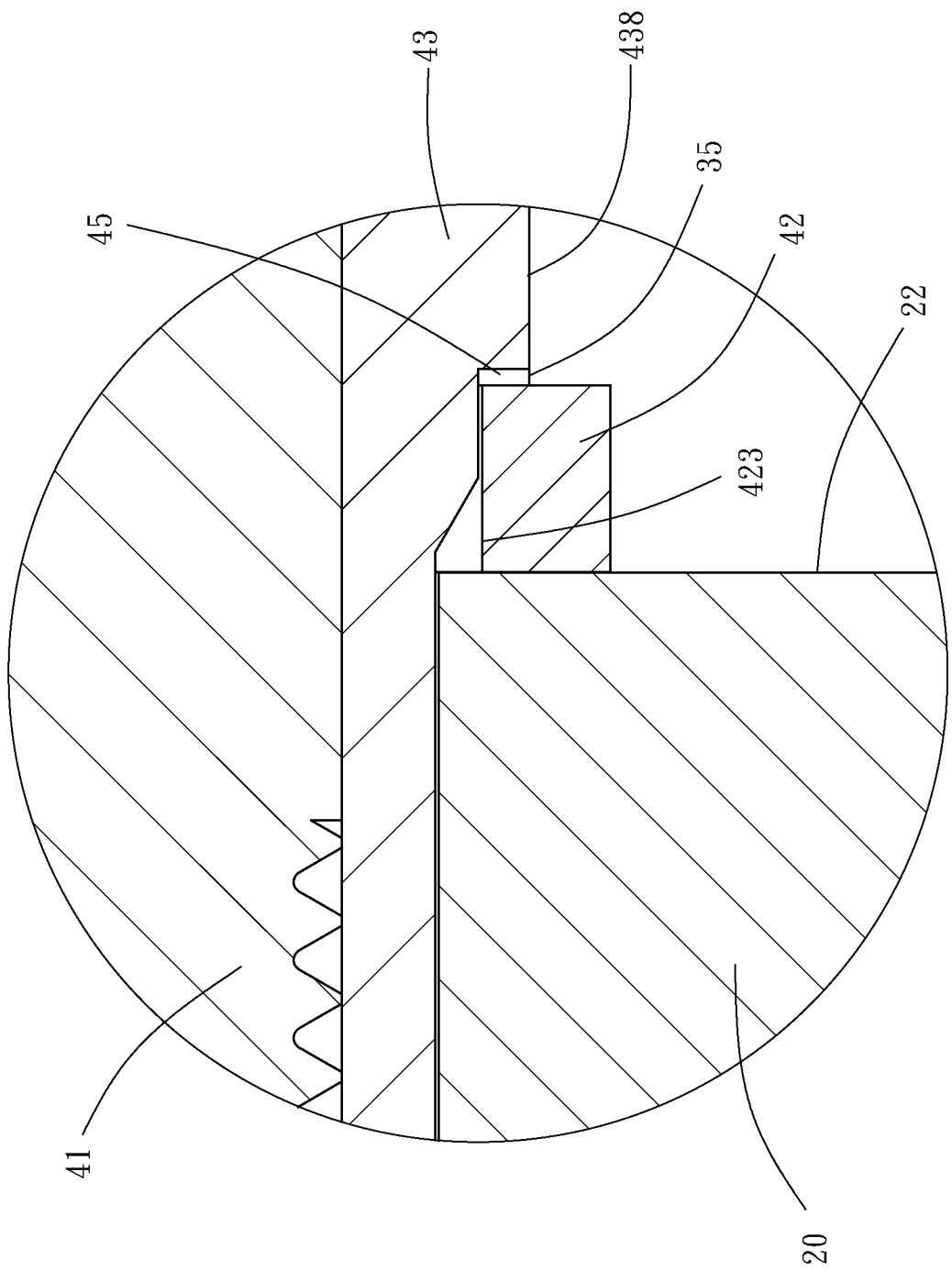
FIG. 13 is an enlarged view of the part B in FIG. 12.

As shown in FIG. 11, when the assembly is accomplished, the large insertion section 433 of the sleeve 43 is disposed in the insertion hole 347 of the second through hole 34, the abutment portion 431 of the sleeve 43 is disposed in the recess 341 of the second through hole 34 and abutted against the inner bottom surface 345. As shown in FIG. 12, one of the side surfaces 438 of the sleeve 43 faces toward the recess inner wall 346 and located closely thereto, and the other side surface 438 is aligned with the outer peripheral surface 35 of the connecting seat 30, as shown in FIG. 13. Besides, as shown in FIG. 9, the insertion hole 347 of each second through hole 34 in this embodiment has an opening 348 located on the outer peripheral surface 35 of the connecting seat 30. The outer edge 344 of the recess opening 342 of the recess 341 is directly connected with the opening 348 of the insertion hole 347, enabling the large insertion section 433 of the sleeve 43 to enter the insertion hole 347 of the second through hole 34 through the opening 348, thereby convenient for assembly. The other structural features in this embodiment are similar to those in the first preferred embodiment, thereby not repeatedly described hereinunder.

Figure 1B:
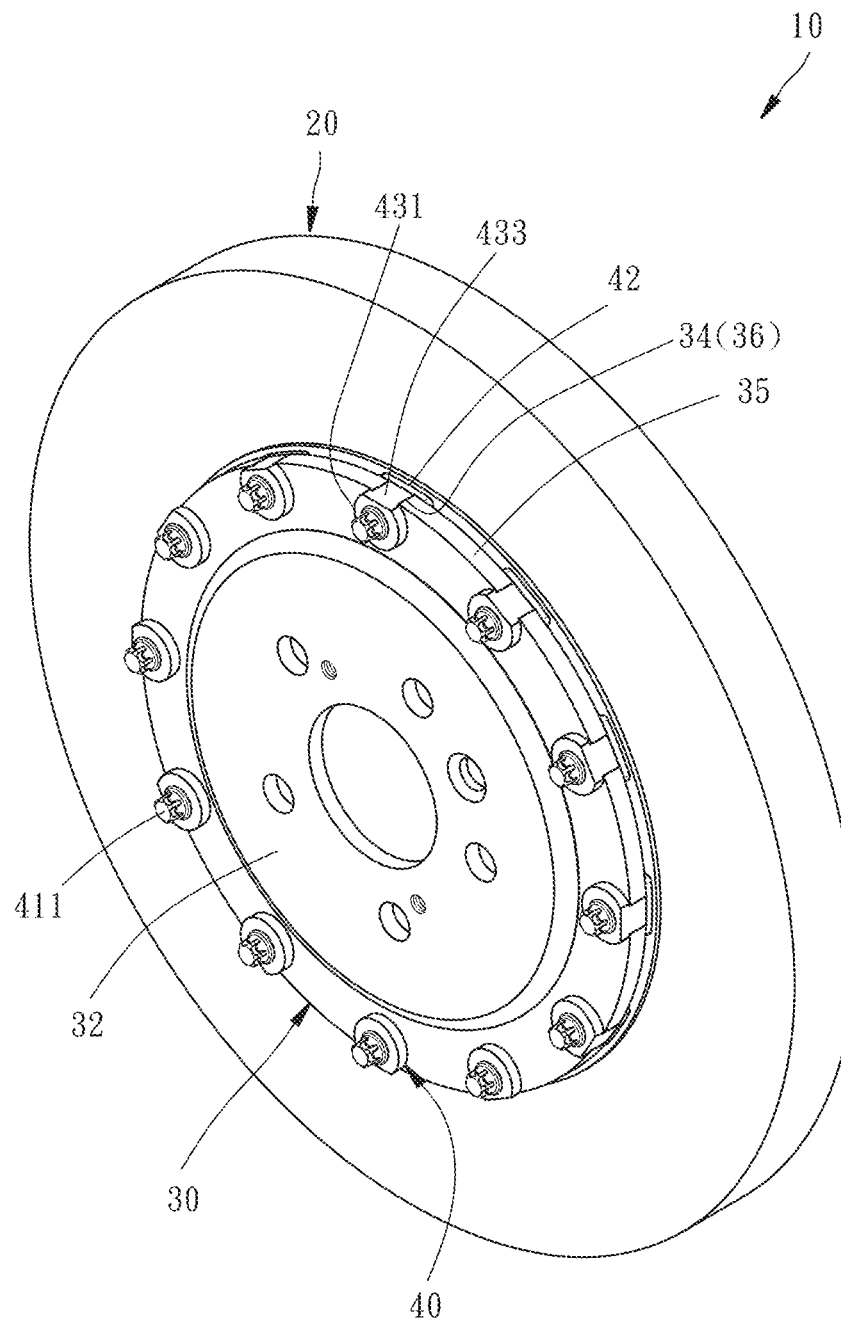
Figure 1B:
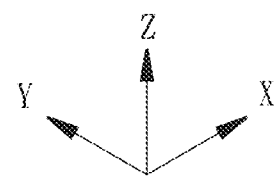

It can be known from the above description and FIG. 9 and FIG. 1B that the insertion hole 347 and the inner bottom surface 345 of the second through hole 34 in this embodiment are just as the second through hole 34 and the rear surface 32 in the first preferred embodiment respectively. Compared with the connecting seat 30 in the first preferred embodiment, the connecting seat 30 in this embodiment has the additional part formed by the peripheral region 324, thereby becoming a thicker structure. In this way, the structural strength is relatively higher. Besides, it can be provided with the aforementioned recess 341 for the abutment portion 431 of the sleeve 43 to be positioned in the recess 341, so that the effect of the fastening device 40 fastening the disc main body 20 to the connecting seat 30 is even better. The other effects of this embodiment are similar to those of the first preferred embodiment, thereby not repeatedly described hereinunder.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A brake disc assembly, which is defined with a first direction and a second direction opposite to the first direction, the brake disc assembly comprising:
    a disc main body comprising a front surface facing toward the first direction, a rear surface facing toward the second direction, and a plurality of first through holes penetrating through the front surface and the rear surface;
    a connecting seat comprising a front surface facing toward the first direction, a rear surface facing toward the second direction, and a plurality of second through holes penetrating through the front surface and the rear surface of the connecting seat; and
    a plurality of fastening devices, each of the fastening devices comprising a bolt, a sleeve, a spacer and a nut, the spacer being clamped between the rear surface of the disc main body and the front surface of the connecting seat and comprising a third through hole, the sleeve comprising an abutment portion and an insertion portion connected with each other, and a fourth through hole penetrating through the abutment portion and the insertion portion, the insertion portion of the sleeve being disposed in the first through hole, the second through hole and the third through hole, the bolt comprising a head portion and a rod portion connected with each other, the rod portion being inserted through the fourth through hole and comprising a threaded section, the nut being fixedly screwed onto the threaded section, so that the disc main body, the spacer, the connecting seat and the abutment portion of the sleeve are clamped between the head portion of the bolt and the nut.

2. The brake disc assembly as claimed in claim 1, wherein the insertion portion of the sleeve comprises a large insertion section connected to the abutment portion and larger in transverse size than the third through hole; a gap is provided between the spacer and the large insertion section.

3. The brake disc assembly as claimed in claim 1, wherein the insertion portion of the sleeve comprises a large insertion section connected to the abutment portion and larger in transverse size than the third through hole, a medium insertion section connected to the large insertion section and matched in transverse size with the third through hole, and a small insertion section smaller in transverse size than the medium insertion section;
    the medium insertion section is disposed in the third through hole; the small insertion section is partially located in the third through hole.

4. The brake disc assembly as claimed in claim 3, wherein a gap is provided between the spacer and the large insertion section.

5. The brake disc assembly as claimed in claim 3, wherein the insertion portion of the sleeve comprises an inclined section connected between the medium insertion section and the small insertion section and located in the third through hole; the inclined section gradually decreases in transverse size thereof from the medium insertion section to the small insertion section.

6. The brake disc assembly as claimed in claim 5, wherein the large insertion section of the sleeve is disposed in the second through hole of the connecting seat; the small insertion section of the sleeve is disposed in the first through hole of the disc main body; the abutment portion of the sleeve is abutted against the rear surface of the connecting seat; the head portion of the bolt is abutted against the abutment portion of the sleeve; the nut is abutted against the front surface of the disc main body.

7. The brake disc assembly as claimed in claim 6, wherein the large insertion section of the sleeve and the second through hole of the connecting seat are both non-circular in transverse cross-section; the medium insertion section of the sleeve and the third through hole of the spacer are both non-circular in transverse cross-section.

8. The brake disc assembly as claimed in claim 1, wherein each of the second through holes comprises a recess recessed from the rear surface of the connecting seat, and an insertion hole extending from an inner bottom surface of the recess to the front surface of the connecting seat; the insertion portion of the sleeve comprises a large insertion section connected to the abutment portion and larger in transverse size than the third through hole; the large insertion section of the sleeve is disposed in the insertion hole; the abutment portion of the sleeve is disposed in the recess and abutted against the inner bottom surface of the recess.

9. The brake disc assembly as claimed in claim 8, wherein the connecting seat comprises an outer peripheral surface connecting the front surface and the rear surface of the connecting seat; the rear surface of the connecting seat comprises a central region, and a peripheral region inclinedly extending outward and frontward from an outer periphery of the central region to the outer peripheral surface; the recess of each of the second through holes is recessed from the peripheral region.

10. The brake disc assembly as claimed in claim 9, wherein the recess of each of the second through holes has a recess opening located in the peripheral region; the insertion hole of each of the second through holes has an opening located on the outer peripheral surface; for each of the second through holes, the recess opening of the recess and the opening of the insertion hole are directly connected with each other.

11. The brake disc assembly as claimed in claim 10, wherein the recess of each of the second through holes has a recess inner wall directly connected with the insertion hole; the sleeve has two side surfaces; each of the side surfaces is simultaneously located at the abutment portion and the large insertion section; one of the side surfaces faces toward the recess inner wall; the other side surface is aligned with the outer peripheral surface.

12. A fastening device of a brake disc assembly, which is adapted for fastening a disc main body and a connecting seat to each other, wherein the disc main body has a first through hole and the connecting seat has a second through hole; the fastening device comprising:
    a spacer adapted to be disposed between the disc main body and the connecting seat, and having a third through hole;
    a sleeve comprising an abutment portion and an insertion portion connected with each other, and a fourth through hole penetrating through the abutment portion and the insertion portion, the insertion portion being adapted to be disposed in the first through hole, the second through hole and the third through hole;
    a bolt comprising a head portion and a rod portion connected with each other, the rod portion being inserted through the fourth through hole and comprising a threaded section; and a nut fixedly screwed onto the threaded section for clamping the disc main body, the spacer, the connecting seat and the abutment portion of the sleeve between the head portion of the bolt and the nut.

13. The fastening device as claimed in claim 12, wherein an inner wall of the third through hole is partially shaped as a plane; the insertion portion of the sleeve has a plane; the plane of the insertion portion is in face-to-face contact with the plane of the inner wall of the third through hole correspondingly.

14. The fastening device as claimed in claim 12, wherein the insertion portion comprises a large insertion section which is rectangular in transverse cross-section and larger in transverse size than the third through hole, a medium insertion section matched in transverse size with the third through hole, an inclined section and a small insertion section shaped as a cylinder and smaller in transverse size than the medium insertion section, which are connected in order from the abutment portion.

15. The fastening device as claimed in claim 14, wherein the medium insertion section of the insertion portion and the third through hole of the spacer are both non-circular in transverse cross-section.

16. The fastening device as claimed in claim 12, wherein the insertion portion of the sleeve comprises a large insertion section connected to the abutment portion and adapted to be disposed in the second through hole; the sleeve has two side surfaces; each of the side surfaces is simultaneously located at the abutment portion and the large insertion section.

* * * * *